United States Patent [19]
Zagalsky

[11] 3,774,017
[45] Nov. 20, 1973

[54] APPARATUS AND METHOD FOR ACHIEVING OPTIMUM PERFORMANCE OF AN AIRPLANE

[75] Inventor: Nelson R. Zagalsky, New Hope, Minn.

[73] Assignee: Honeywell Inc., Minneapolis, Minn.

[22] Filed: Oct. 21, 1971

[21] Appl. No.: 191,222

[52] U.S. Cl........ 235/150.2, 73/178 R, 235/150.23, 340/27 R
[51] Int. Cl. .......................... G06g 7/78, G01c 21/20
[58] Field of Search..................... 235/150.2, 150.23, 235/151; 340/27 R, 27 NA; 73/178, 182

[56] References Cited
UNITED STATES PATENTS

| | | | |
|---|---|---|---|
| 3,080,546 | 3/1963 | Deschamps et al. | 340/27 NA |
| 3,152,248 | 10/1964 | Deschamps | 340/27 NA |
| 2,837,738 | 6/1958 | Valkenburgh | 235/193 X |
| 2,944,736 | 7/1960 | Elms et al. | 235/193 X |
| 3,052,122 | 9/1962 | Westerback | 73/178 R |
| 3,077,110 | 2/1963 | Gold | 340/27 NA |
| 3,504,165 | 3/1970 | Richardson et al. | 235/150.23 |
| 3,617,721 | 11/1971 | Foster | 235/150.2 |

OTHER PUBLICATIONS

Rutowsky: Energy Approach to the General Aircraft Performance Problem, Journal of Aeronaut. Science March 1954 pages 187/195.

*Primary Examiner*—Felix D. Gruber
*Attorney*—Charles J. Ungemach et al.

[57] ABSTRACT

Apparatus for providing a pilot of an airplane with an indication of the specific energy of the airplane and a method for operating an airplane at an optimum level of performance by the application of the apparatus.

4 Claims, 3 Drawing Figures

APPARATUS AND METHOD FOR ACHIEVING OPTIMUM PERFORMANCE OF AN AIRPLANE

BACKGROUND OF THE INVENTION

The present invention is an improvement in aeronautical instrumentation and in the methods of operating high performance airplanes.

In an effort to utilize the full capabilities of high performance airplanes preferred, methods of managing the operation of such airplanes have been developed. Each of these methods is aimed at helping the pilot maneuver his airplane in a prescribed manner that is most beneficial with respect to a particular flight objective: the prescribed manner for maneuvering the airplane has conveniently been defined by a schedule of related values of airspeed and altitude to be achieved as the maneuver proceeds. Fulfilling such schedule enables a pilot to accomplish the particular maneuver, such as a minimum fuel climb for instance, by which he places his airplane at a high altitude with a minimum expenditure of fuel. However, a pilot may have difficulty in bringing his airplane to a condition of airspeed and altitude representing a point on one of these schedules because he can not readily determine his present flight state, in terms of airspeed and altitude, relative to each schedule. He must observe his instrument indications of airspeed and altitude refer to the schedule to determine his flight state relative thereto, and then try to control the flight path angle of his airplane so as to bring its airspeed and altitude simultaneously to the schedule while monitoring both the instrument indications and the schedule. Even if the schedule is achieved, the pilot may exprience the same difficulty in maintaining the schedule.

This difficulty is removed through the use of the present invention, which utilizes the concept of specific energy of the airplane, that is, the total energy per unit weight of the airplane. The use of specific energy as a basis of efficient maneuvering is taught for example in an article by E. S. Rutowski on pages 187–195 inclusive of the Journal of Aeronautical Science for March, 1954. The total energy of an airplane is the sum of the kinetic energy and the potential energy of the airplane. It is known that constant energy maneuvers may be executed very rapidly by an airplane. Maneuvers that are no more than interchanges of kinetic and potential energy may be executed much more rapidly than maneuvers requiring a substantial increase or decrease in energy.

SUMMARY OF THE INVENTION

The present invention is intended to take practical advantage of the concept of specific energy in facilitating the efforts of a pilot to utilize the full capabilities of his airplane and to obtain optimum performance from his airplane. A principle object of this invention is to provide the pilot with a continuous indication of the specific energy of his airplane and with a new method of regulating the flight of the airplane through the use of new schedules that describe various maneuvers and potential flight objectives in terms of specific energy and either airspeed or altitude.

Various other objects, advantages, and features of novelty which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

DESCRIPTION

Figure 1:
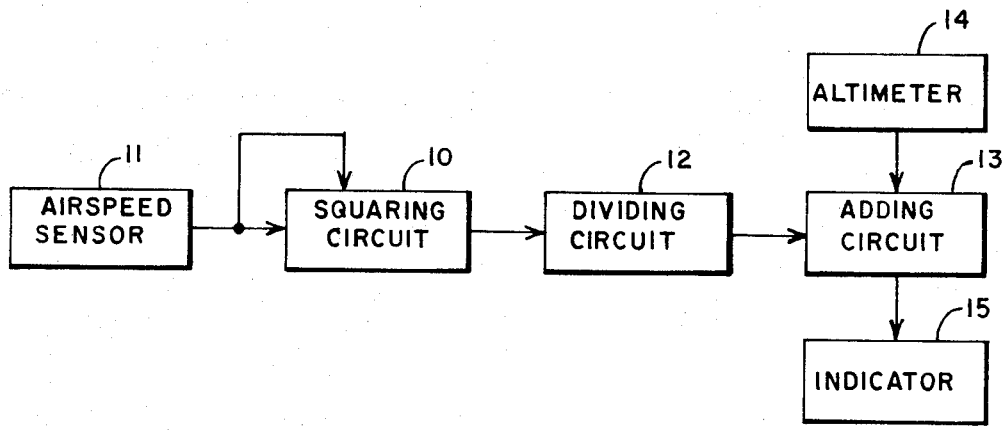
FIG. 1 is a block diagram of the preferred embodiment of the present invention.

Referring to FIG. 1, a squaring circuit 10 receives from an airspeed sensor 11 a voltage signal indicative of the true airspeed of an airplane. The output from squaring circuit 10 is connected to a dividing circuit 12, and the output from dividing circuit 12 is connected to an adding circuit 13. Adding circuit 13 is also connected to receive a voltage signal representative of the airplane's altitude from an altimeter 14. The output of adding circuit 13 is connected to an indicator 15 which provides a visual indication of the output from adding circuit 13: indicator 15 may be any device capable of making the pilot of the airplane aware of the output from adding circuit 13.

Figure 2:
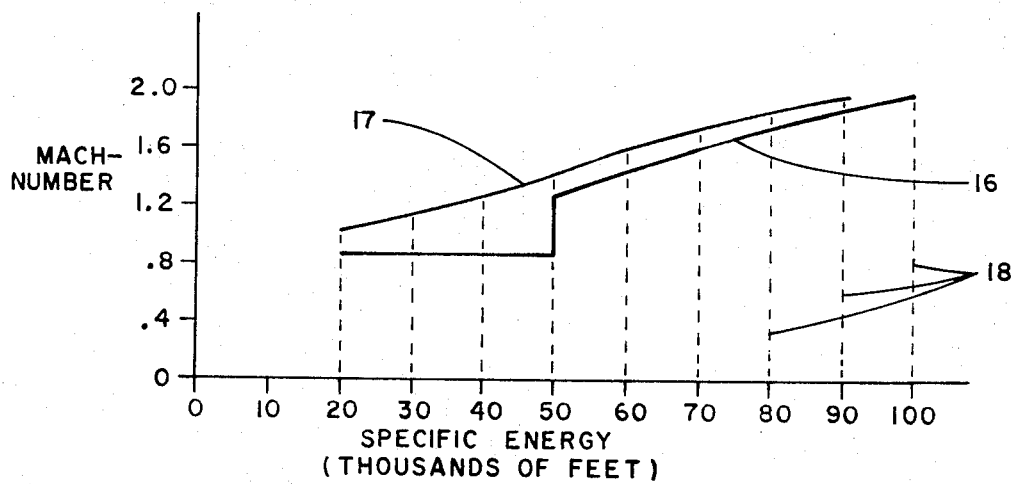
FIG. 2 shows a typical Mach-number/energy schedule for a minimum-time-energy-climb maneuver.

FIG. 2 shows a typical Mach number/energy schedule for a minimum time energy climb maneuver in which it is desired to achieve a predetermined energy state (altitude and airspeed) of an airplane in a minimum interval. The Mach number is the quotient of the true airspeed divided by the speed of sound at the altitude and temperature ambient to the airplane. This schedule is used to aid the pilot in maneuvering his airplane at optimum performance by practicing the present invention. An airplane operated according to this schedule achieves a high Mach-number at a particular altitude in less time than by mere acceleration at that constant altitude. Adherence to this schedule places an airplane at a high Mach-number altitude combination in a minimum amount of time, thereby improving the effectiveness of the airplane.

OPERATION

The present invention operates to calculate the specific energy E of an airplane from the expression:

$$E = v^2/2g + h \tag{1}$$

in which v equals the true airspeed of the airplane containing the present invention, h equals the altitude of the airplane, and g equals the acceleration of gravity. In this equation the first term on the right hand side may be called the specific kinetic energy of the airplane and the second term may be called the specific potential energy of the airplane.

Equation (1) is derived in the following manner. The total energy $E_T$ of the airplane is given by the expression $$E_T = E_K + E_P \tag{2}$$

where $E_K$ and $E_P$ are the kinetic energy and the potential energy of the airplane, respectively. Since $$E_K = \tfrac{1}{2}mv^2 \quad (3)$$

and $$E_p = mgh \quad (4)$$

(where m equals the mass of the aircraft,)

$$E_T = \tfrac{1}{2}mv^2 + mgh \quad (5)$$

by substituting equations (3) and (4) into equation (2).

By substituting $m = w/g$, where w equals the weight of the airplane, into equation (5), then $$E_T = w[\;v^2/g + h\;] \quad (6)$$

However, since the present invention involves specific energy or the energy per unit weight of the airplane, equation (6) becomes $$E = \tfrac{1}{2}\,v^2/g + h \quad (1)$$

In this equation h is in units of feet and the units of $v^2/g$ — dimensionally (ft/sec)$^2$ ÷ ft$^2$/sec, also reduces to feet, so that the specific energy E is in units of feet.

Referring to FIG. 1, squaring circuit 10 receives a voltage signal v representative of the true airspeed of the airplane from airspeed sensor 11. However, such a signal is readily available from existing instruments aboard most high performance airplanes. Squaring circuit 10 multiplies the value of v by itself and produces a first output signal representative of the quantity $v^2$.

Dividing circuit 12 receives and divides the first output signal by a value of twice the acceleration due to gravity g. Dividing circuit 12 produces a second output signal representative of the quotient $v^2/2g$.

Adding circuit 13 receives the second output signal and a voltage signal representative of h from altimeter 14. Adding circuit 13 produces a third output signal representative of the quantity $v^2/2g + h$, which is E.

The third output signal is received by indicator 15 which provides a visual indication of the value of the quantity E.

Figure 3:
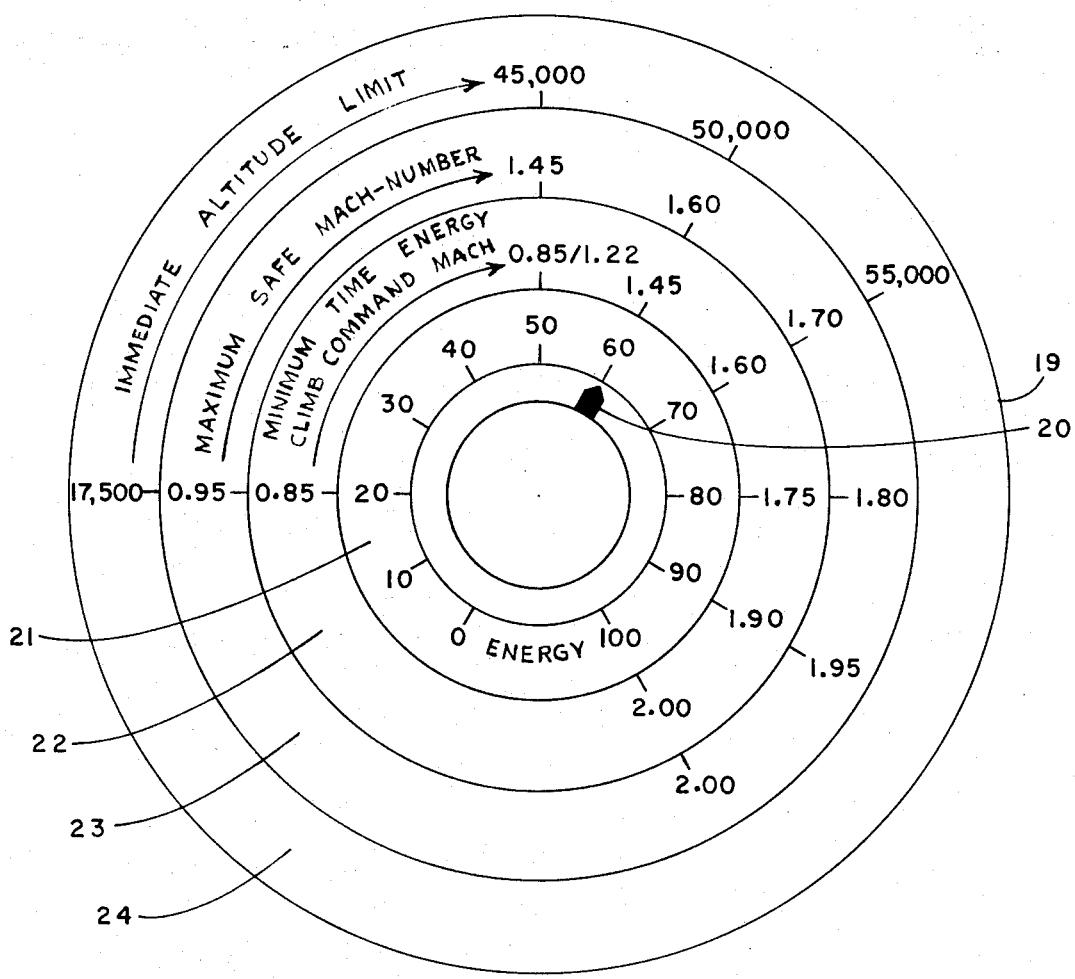
FIG. 3 shows one embodiment of indicator 15 as shown in FIG. 1.

The Mach-number/energy schedule shown in FIG. 2 may be used with the preferred embodiment of the invention shown in FIG. 1 to help the pilot maneuver his airplane to a high Mach-number and high altitude flight state in a minimum amount of time. The schedule describes a minimum time energy maneuver 16 in terms of corresponding values of Mach-number and energy. A maximum safe airspeed limit 17 gives notice of the maximum safe airspeed of the airplane at various altitudes due to structural limitations. A plurality of constant energy lines 18 are shown for easier identification of maximum afe airspeeds from various energy levels. The earlier airspeed/altitude schedules were provided for pilots in the form of diagrams to be secured to a knee board for ready reference, and the same can be done with a schedule such as that of FIG. 2. However it is more convenient to incorporate the information directly into an embodiment of indicator 15, as shown in FIG. 3. Here a meter 19 includes a needle which indicates the specific energy of the airplane on a first fixed scale 21 calibrated in thousands of feet. A second scale 22 concentric with scale 21 presents the information contained in the schedule of FIG. 2.

It will be noted that the Mach number 0.85 is placed on scale 22 in alignment with the range from 20,000 feet to 50,000 feet on scale 21, that at the 50,000 foot graduation on scale 21 there is also indicated on scale 22 the Mach number 1.22, indicating to the pilot that at that energy level he should increase his airspeed without changing his specific energy (by diving) and that from 50,000 feet to 100,000 feet of the specific energy scale corresponding scheduled values of Mach number are aligned with particular values of specific energy. Scale 22 is angularly fixed with respect to scale 21, but is preferably removable so that alternative schedules may be substituted if other maneuvers having different characteristics are to be undertaken. The maneuvers represented by scale 22 or schedule 16 are of course based upon theoretical considerations or pragmatic investigations, and of themselves are not part of my invention.

To execute a minimum time energy climb maneuver according to the schedule shown in FIG. 2 and by scales 21 and 22 on meter 19 in FIG. 3, the pilot simply reads the energy indicated on scale 21 by needle 20 of meter 19. The corresponding indication on scale 22 is the Mach-number that the airplane must have to place the airplane on the schedule. If the Mach-number indicated on scale 22 is higher than the actual Mach-number of the airplane, the pilot simply maneuvers the airplane so as to increase the Mach-number by exchanging potential energy for kinetic energy thereby keeping the energy indication of meter 19 nearby constant. Once the actual Mach-number and the Mach-number indicated on scale 22 by needle 20 are identical, the airplane is on the intended schedule. To remain on the schedule, the pilot maintains the actual Mach-number at the Mach-number indicated on scale 22 by needle 20 as the energy of the airplane increases. Presentation of specific energy information directly on the face of meter 19 makes possible the provision of further information useful to the pilot when further scales are provided. For example, a first additional fixed scale 23, concentric with scale 21, may be graduated to indicate the maximum safe Mach number that may be obtained in a constant energy diving maneuver from each specific energy state indicated on scale 21. A second additional fixed scale 24, also concentric with scale 21, may be graduated to indicate the maximum safe altitude that may be obtained in a constant energy climbing maneuver for each specific energy state indicated on scale 21. The values for these additional scales are determined by the same equations that form the basis for scale 21, in the first case converting by the potential energy component to its kinetic energy equivalent, and in the second case by converting the kinetic energy component into its potential energy equivalent: the resulting values are of course arbitrarily reduced where the structural or thermal limits of the airplane would otherwise be exceeded, or to insure a safe residual airspeed at the end of a climb or a safe residual altitude at the end of a dive.

Scales 23 and 24 are employed to inform the pilot of the capabilities in Mach-number and altitude respectively that his airplane can achieve from the corresponding energy level indicated by needle 20 through necessary interchange of kinetic and potential energy. These capabilities are immediately available to the pilot since the interchange of kinetic and potential energy does not require an alteration of the total energy of the airplane that would otherwise increase the time of achievement.

Of course, an altitude/energy schedule may be used instead of a Mach-number/energy schedule for guiding the proper execution of a particular maneuver. Further additional scales could of course be provided to inform the pilot of the relation of the airplane's present specific energy to other flight variables where such information might be helpful. The pilot then uses his altimeter rather than his Mach meter to determine when he has achieved and is maintaining the desired schedule.

I claim as my invention:

1. Apparatus for providing a continuous indication of the specific energy of an airplane comprising, in combination:
    means for producing a first signal representative of the specific kinetic energy of the airplane;
    means for producing a second signal representative of the specific potential energy of the airplane; and
    output means connected to receive said first and second signals for providing an indication of their sum as a measure of the specific energy of the aircraft.

2. The apparatus of claim 1 wherein the first named means comprises:
    condition responsive means for producing a first voltage signal which varies in real time with the true airspeed of the airplane;
    a squaring circuit for receiving said first voltage signal said squaring circuit being operative for producing a second voltage signal indicative of the square of said first voltage signal; and
    a dividing circuit for receiving said second voltage signal, said dividing circuit being operative for dividing said second voltage signal by twice the acceleration due to gravity, thereby producing said first signal indicative of the kinetic energy.

3. The apparatus of claim 1 wherein said output means comprises:
    an adding circuit for receiving said first and second signals, said adding circuit being operative for producing a third signal indicative of the sum of said first and second signals; and
    an indicator for receiving said third signal, said indicator being operative for providing an indication to the pilot of the value of said third signal.

4. Apparatus according to claim 3, in which said indicator comprises:
    a first fixed scale graduated in units of energy;
    a needle moveable along said scale in accordance with the actual energy of the aircraft; and
    a second fixed scale aligned with the first scale and graduated in units of a parameter related to energy having predetermined values for values of energy aligned therewith on said first scale,
    so that any needle position can be read both as the actual value of aircraft energy and as the related predetermined value of the parameter.

\* \* \* \* \*